May 12, 1942. C. S. MONROE Re. 22,096

OSCILLATING LAMP

Original Filed Aug. 19, 1937 2 Sheets-Sheet 1

Inventor:
Charles S. Monroe.
By Fisher, Clapp, Somers & Pond,
Attys.

May 12, 1942. C. S. MONROE Re. 22,096

OSCILLATING LAMP

Original Filed Aug. 19, 1937 2 Sheets-Sheet 2

Inventor
Charles S. Monroe.
By Fisher, Clapp, Soans & Pond,
Attys.

Reissued May 12, 1942

Re. 22,096

UNITED STATES PATENT OFFICE 22,096

OSCILLATING LAMP

Charles S. Monroe, Chicago, Ill.

Original No. 2,133,106, dated October 11, 1938, Serial No. 159,926, August 19, 1937. Application for reissue September 30, 1939, Serial No. 297,393

9 Claims. (Cl. 240—48)

This invention relates to a class of electric lamps to some extent used on automobiles and similar motor vehicles wherein the lamp is pivotally mounted to oscillate horizontally or vertically or under a compound horizontal and vertical movement to light up the road and particularly the edges and shoulders of the road at night; the oscillating movement being effected by a motor under the control of the driver.

The primary purpose of my improved lamp is to serve as what I term a "passing" lamp, to signal, by a horizontally oscillating light beam, to a car ahead that the driver desires to pass. The main object of the invention has been to provide a very simple, practical and inexpensive lamp of this type.

Other objects and attendant advantages of the invention will be apparent to persons familiar with lamps of this character from the following detailed description taken in connection with the accompanying drawings in which I have shown an illustrative embodiment of the invention and wherein.

Figure 1:
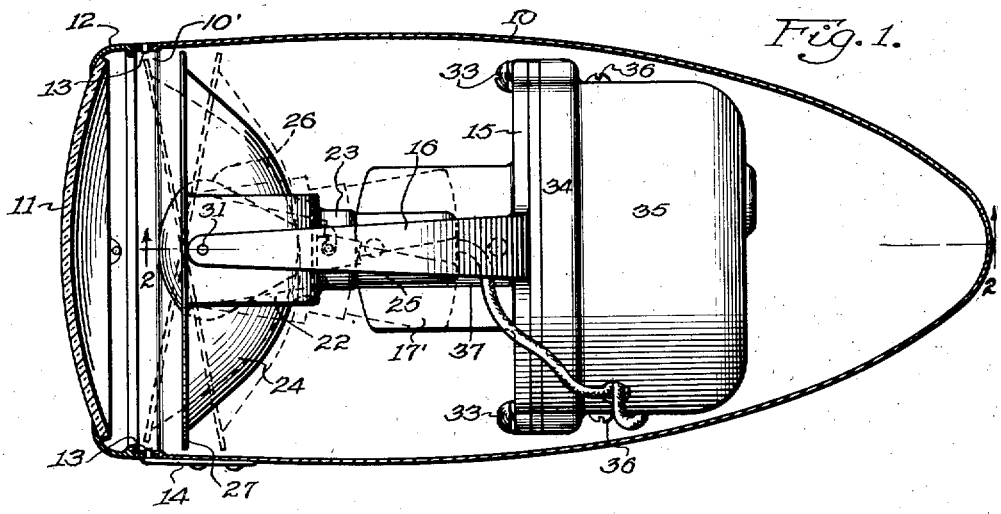
Fig. 1 is a top plan view with the hood or casing in horizontal section.
Figure 2:
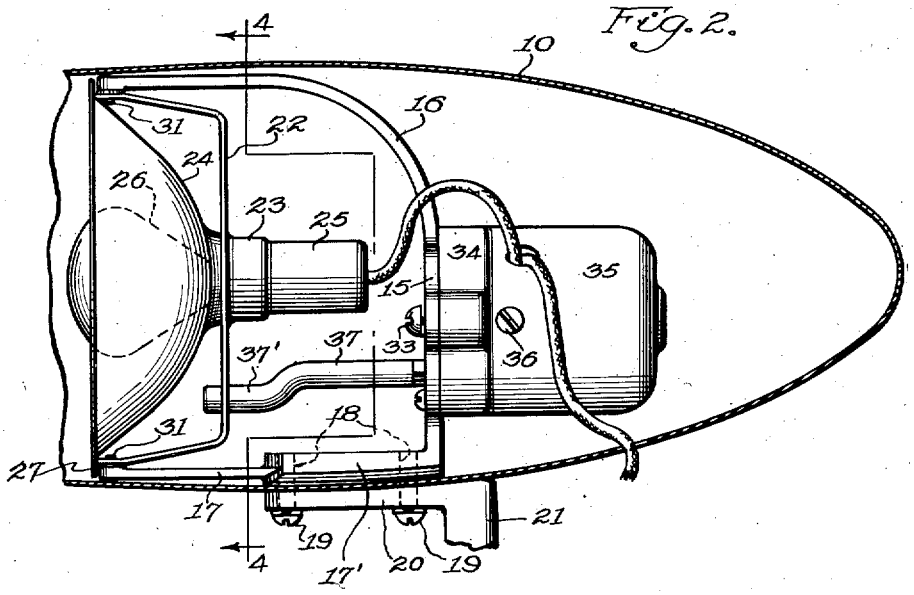
Fig. 2 is a side elevation, with the hood or casing in vertical section on the line 2—2 of Fig. 1, and broken off at the front.

Referring to the drawings, 10 designates a metal hood or casing preferably of the shape illustrated in Figs. 1 and 2, which contains the lamp, its mounting frame, motor, and motor-actuated oscillating means. The forward open end of the hood 10 is closed by a glass lens 11 mounted in a suitable rim 12 which fits over an inwardly offset rim 10′ of the hood and is removably locked thereto by pins 13 engaged with holes in the rim 10′ locked against displacement by one or more spring keepers 14.

The supporting frame for the lamp and motor is preferably a casting having a flat base plate 15 and a pair of upper and lower forwardly extending arms 16 and 17 respectively. The inner portion 17′ of the lower arm 17 is widened and concaved on its lower side to fit the casing 10, and provided with a pair of tapped holes 18 to receive screws 19, the said screws also serving to mount the casing 10 on a seat or saddle 20 carried by an upright post 21 that may be mounted in any suitable position on the forward portion of the motor vehicle, sufficiently in rear of the front bumper to protect the lamp from damage.

Figure 3:
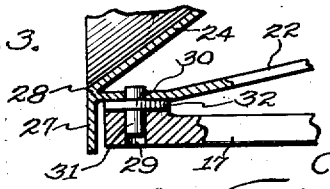
Fig. 3 is a sectional detail showing the means for pivoting the reflector in the arms of the frame.

Lying between the arms 16 and 17 of the frame and pivoted in the free ends of said arm is a yoke 22 formed with a central aperture through which extends the shank or stem 23 of a bowl-shaped lamp reflector 24; the hollow shank 23 also supporting a lamp socket 25, in the forward end of which is mounted the electric lamp bulb 26. Fig. 3 illustrates the preferred means of mounting and pivoting the yoke and reflector in the arms of the frame, whereby it will be seen that the reflector 24 is formed with a peripheral flange 27 that is soldered at 28 to the ends of the arms of yoke 22; and the frame arms 16 and 17 and the arms of the yoke 22 have registering holes 29 and 30 respectively, to receive a pivot pin 31 formed with an integral spacing washer 32 that, when the parts are assembled, prevents the escape of the pin.

Figure 4:
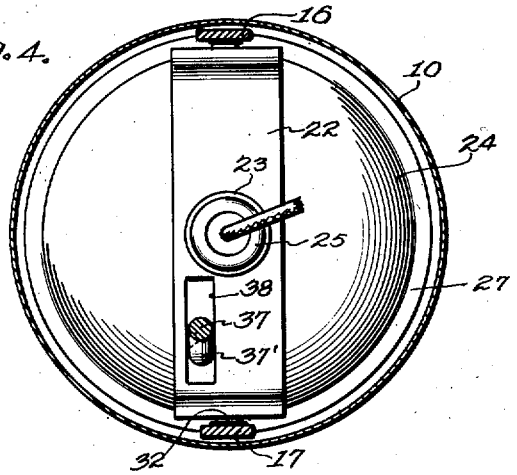
Fig. 4 is a transverse section taken on the offset line 4—4 of Fig. 2.

Attached to the rear side of the base 15 of the frame as by screws 33 is the frame base 34 of a small electric motor, preferably of the oscillating type such as is used to actuate windshield wipers, although a rotary motor may be employed. This motor is not shown in detail as it is a known commercial article, and the main portion of the frame, the field, armature, etc., are covered by a cap 35 attached by screws 36. Through speed reducing gearing (not shown) the motor oscillates a forwardly projecting shaft 37 which extends through a hole in the frame base 15 and is formed with an offset or crank arm 37′, which latter, as best shown in Fig. 4, lies within a vertical slot 38 formed in a lamp and reflector carrying yoke 22, as a result of which, when the motor is energized, the oscillations of the shaft 37 transmit horizontal oscillations to the reflector 24 and lamp 26 carried by the yoke 22, so that, if the lamp is lighted, a horizontal beam of light is thrown back and forth from side to side of the road. It is obvious that if the motor transmits a continuous rotary movement to the shaft 37, the result will be the same, the slot 38 being of sufficient length to accommodate the maximum high and low positions of the crank 37′. The portion of yoke 22 engaged by the crank 37′ forms in effect a reflector oscillating arm that extends parallel with the pivot axis of the reflector.

Figure 5:
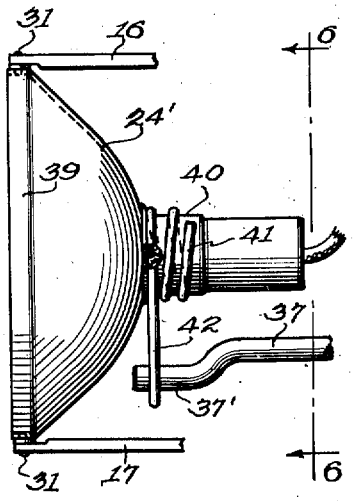
Fig. 5 is a fragmentary side elevation illustrating a modification.
Figure 6:
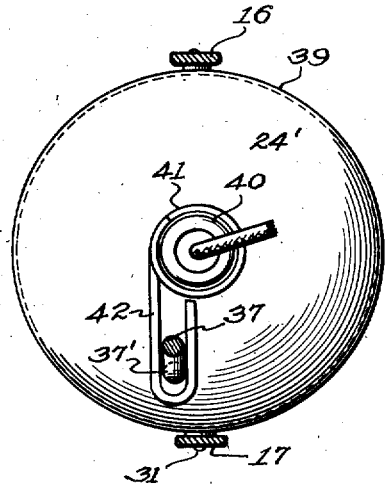
Fig. 6 is a transverse section on the line 6—6 of Fig. 5.

Figs. 5 and 6 illustrate a modification, wherein the yoke 22 is dispensed with, and the reflector 24′ is formed with a peripheral rim or band 39 that is directly pivoted to and between the yoke arms 16 and 17 by the pivot pins 31; and mounted on and soldered to the hollow reflector shank or stem 40 is a wire coil 41 formed with a tangential integral loop 42 lying parallel with the pivot axis of the reflector that receives and cooperates with the crank 37′ of the shaft 37 in the same way and to the same effect as the slot 38 of the yoke 22 previously described.

It is to be understood that in practice the motor and lamp circuit is wired through the usual generator to the dash of the car and is equipped at the dash with a normally open switch that may be closed by the driver as he approaches a vehicle which he wishes to pass, the waving light beam constituting a signal to the car ahead to allow room for passing.

I am aware that mechanically oscillated lamps for automobiles are broadly known; but such lamps have heretofore been unduly complicated and expensive. It will be seen that my improved lamp is of very simple and relatively inexpensive construction, requiring no gears (except the usual speed reducing gears associated with the motor) and certain and reliable in action. The structural details herein shown and described may, obviously, be varied within the purview and scope of the appended claims.

I claim:

1. In an oscillating lamp of the type described, the combination of a frame structure including a pair of diametrically spaced arms extending forwardly from the rear of said frame and disposed in a vertical plane, a bowl-shaped reflector pivoted at diametrically opposite points of its periphery on and between the free ends of said arms, a lamp socket and lamp mounted in said reflector, an arm fast with said reflector and extending parallel with the pivot axis of the latter, a motor mounted on said frame, and a motor driven shaft having a crank drivingly engaged with said last mentioned arm in a manner to swing the latter sidewise to thereby oscillate said reflector and lamp.

2. In an oscillating lamp of the type described, the combination of a frame structure including a pair of diametrically spaced arms extending forwardly from the rear of said frame and disposed in a vertical plane, a bowl-shaped reflector pivoted at diametrically opposite points of its periphery on and between the free ends of said arms, and having a central hollow stem, a lamp socket mounted in said stem, a lamp bulb mounted in said socket, a lateral arm on said stem extending parallel with the pivot axis of said reflector, a motor mounted on said frame, and a motor driven shaft extending forwardly between said spaced arms and terminating in a crank engaged with said lateral arm in a manner to swing the latter sidewise and thereby oscillate said reflector and lamp.

3. In an oscillating lamp of the type described, the combination of a frame having a base plate and a pair of forwardly extending arms springing from said base plate, a bowl-shaped reflector pivoted at diametrically opposite points of its periphery on and between the free ends of said arms and having a central hollow stem, a lamp socket mounted in said stem, a lamp bulb mounted in said socket, a lateral arm on said stem, a motor mounted on the rear side of said base plate, and a motor driven shaft extending forwardly of said base plate between and substantially parallel with said arms and terminating in a crank engaged with said lateral arm.

4. In an oscillating lamp of the type described, the combination of a frame structure including a pair of diametrically spaced arms extending forwardly from the rear of said frame, a bowl-shaped reflector having a hollow stem, a yoke having its transverse limb mounted on said stem and its arms secured at their free ends to the peripheral portion of said reflector and pivoted to and between the spaced arms of said frame structure, the transverse limb of said yoke having a slot extending substantially radially of said reflector, a lamp socket mounted in said stem, a lamp bulb mounted in said socket, an electric motor mounted on the rear end of said frame, and a motor driven shaft extending between said frame arms and terminating in a crank extending through said slot.

5. In an oscillating lamp of the type described, the combination of a frame structure including a pair of diametrically spaced arms extending forwardly from the rear of said frame, a bowl-shaped reflector pivoted at diametrically opposite points of its periphery to and between the free ends of said arms and having a central hollow stem, a lamp socket and lamp mounted in said stem, a wire coil fast on said stem and formed with an integral loop extending tangentially of said stem, a motor mounted on said frame, and a motor driven shaft having a crank drivingly engaged with said loop to thereby oscillate said reflector and lamp.

6. In an automotive vehicle lamp, a lamp casing, means for stationarily mounting the said lamp casing on an automotive vehicle, a reflector in the said lamp casing including a front portion, means for pivotally mounting the said reflector in the said lamp casing for oscillating movement therein relative to the said lamp casing and in a horizontal plane only and on a fixed vertical axis intersecting the said front portion of said reflector, and means in the said lamp casing for oscillating the said reflector therein relative to the said lamp casing and in the said horizontal plane only.

7. In an automotive vehicle lamp, a lamp casing, means for stationarily mounting the said lamp casing on an automotive vehicle, a light source and reflector in the said lamp casing, and said reflector including a front portion, means for pivotally mounting the said light source and the said reflector in the said lamp casing for oscillating movement as a unit therein relative to the said lamp casing and in a horizontal plane only and on a fixed vertical axis intersecting the said front portion of said reflector, and means in the said lamp casing for oscillating the said light source and the said reflector as a unit therein relative to the said lamp casing and in the said horizontal plane only.

8. In an automotive vehicle lamp, a lamp casing, means for stationarily mounting the said lamp casing on an automotive vehicle, a reflector in the said lamp casing including a front portion, means for pivotally mounting the said reflector in the said lamp casing for oscillating movement therein relative to the said lamp casing and in a horizontal plane only and on a fixed vertical axis intersecting the said front portion of said reflector, and means including a motor in the said lamp casing for oscillating the said reflector therein relative to the said lamp casing and in the said horizontal plane only.

9. In an automotive vehicle lamp, a lamp casing, means for stationarily mounting the said lamp casing on an automotive vehicle, a light source and reflector in the said lamp casing, and said reflector including a front portion, means for pivotally mounting the said light source and the said reflector in the said lamp casing for oscillating movement as a unit therein relative to the said lamp casing and in a horizontal plane only and on a fixed vertical axis intersecting the said front portion of said reflector, and means including a motor in the said lamp casing for oscillating the said light source and the said reflector as a unit therein relative to the said lamp casing and in the said horizontal plane only.

CHARLES S. MONROE.